United States Patent
Fischer et al.

(10) Patent No.: US 10,953,578 B2
(45) Date of Patent: Mar. 23, 2021

(54) SENSOR PRODUCTION BY HOLDING THE INTERMEDIATE INJECTION-MOLDED PART

(71) Applicant: Continental Teves AG & Co. oHG, Frankfurt (DE)

(72) Inventors: Thomas Fischer, Frankfurt am Main (DE); Lothar Biebricher, Oberursel (DE); Jakob Schillinger, Gaimersheim (DE); Dietmar Huber, Rödermark (DE); Michael Schulmeister, Groß-Zimmern (DE); Stefan Günthner, Frankfurt am Main (DE)

(73) Assignee: Continental Teves AG & Co. oHG

( * ) Notice: Subject to any disclaimer, the term of this patent is extended or adjusted under 35 U.S.C. 154(b) by 379 days.

(21) Appl. No.: 15/038,595

(22) PCT Filed: Nov. 27, 2014

(86) PCT No.: PCT/EP2014/075790
§ 371 (c)(1),
(2) Date: May 23, 2016

(87) PCT Pub. No.: WO2015/078958
PCT Pub. Date: Jun. 4, 2015

(65) Prior Publication Data
US 2016/0297122 A1    Oct. 13, 2016

(30) Foreign Application Priority Data

Nov. 28, 2013 (DE) .................... 10 2013 224 464.9
May 6, 2014 (DE) .................... 10 2014 208 429.6

(51) Int. Cl.
*B29C 45/14* (2006.01)
*B29C 45/16* (2006.01)
(Continued)

(52) U.S. Cl.
CPC .. *B29C 45/14819* (2013.01); *B29C 45/14065* (2013.01); *B29C 45/14221* (2013.01);
(Continued)

(58) Field of Classification Search
CPC ............ B29C 33/126; B29C 45/14647; B29C 45/14639; G01D 5/245
(Continued)

(56) References Cited

U.S. PATENT DOCUMENTS

| | | | |
|---|---|---|---|
| 5,527,502 A | 6/1996 | Kiuchi et al. | |
| 5,964,622 A | 10/1999 | Ishikawa et al. | |
| 6,334,361 B1* | 1/2002 | De Volder | B29C 33/126 264/272.15 |
| 8,820,160 B2 | 9/2014 | Doering | |

(Continued)

FOREIGN PATENT DOCUMENTS

| | | |
|---|---|---|
| CN | 103392113 A | 11/2013 |
| CN | 102576033 B | 9/2014 |

(Continued)

OTHER PUBLICATIONS

German Search Report for German Application No. 10 2014 208 429.6 dated Jan. 23, 2015, including partial translation.

(Continued)

*Primary Examiner* — Matthew J Daniels
*Assistant Examiner* — Hana C Page
(74) *Attorney, Agent, or Firm* — RatnerPrestia

(57) ABSTRACT

A method for producing an electronic device, the method including: encasing an electronic assembly with a first casing material; holding the first electronic assembly encased by the first casing material over a holding element such that the holding element is spaced apart from the electronic assembly above the first casing material, and encasing the assembly retained on the holding element with a second casing material.

9 Claims, 7 Drawing Sheets

(51) Int. Cl.
    *B29L 31/34*        (2006.01)
    *G01D 11/24*        (2006.01)

(52) U.S. Cl.
    CPC ........ *B29C 45/14639* (2013.01); *B29C 45/16* (2013.01); *B29C 45/1671* (2013.01); *G01D 11/245* (2013.01); *B29C 2045/14122* (2013.01); *B29C 2045/14131* (2013.01); *B29C 2045/14139* (2013.01); *B29K 2995/0069* (2013.01); *B29L 2031/34* (2013.01); *B29L 2031/3481* (2013.01)

(58) Field of Classification Search
    USPC ....................................................... 264/255
    See application file for complete search history.

(56) References Cited

U.S. PATENT DOCUMENTS

| | | | |
|---|---|---|---|
| 9,014,921 | B2 | 4/2015 | Bretzigheimer |
| 9,513,306 | B2 | 12/2016 | Mueller et al. |
| 9,649,796 | B2 | 5/2017 | Panis et al. |
| 2006/0061010 | A1 | 3/2006 | Huonker |
| 2008/0006440 | A1 | 1/2008 | Huonker |
| 2008/0187614 | A1* | 8/2008 | Babin ............... B29C 45/14065 425/233 |
| 2010/0139419 | A1* | 6/2010 | Bastian ................ G01L 3/104 73/862.325 |
| 2010/0271015 | A1* | 10/2010 | Gruber .................. G01P 1/026 324/244 |
| 2014/0352461 | A1 | 12/2014 | Panis |

FOREIGN PATENT DOCUMENTS

| | | |
|---|---|---|
| DE | 10146949 | 6/2002 |
| DE | 102006008478 | 9/2007 |
| DE | 102006050177 A1 | 4/2008 |
| DE | 102006053308 | 5/2008 |
| DE | 102011080789 | 2/2012 |
| DE | 102011121412 | 6/2013 |
| EP | 1634687 | 3/2006 |
| JP | H04263913 A | 9/1992 |
| JP | H09300401 A | 11/1997 |
| JP | H11254477 A | 9/1999 |
| JP | 2000006156 A | 1/2000 |
| JP | 2008279688 A | 11/2008 |
| JP | 2015501743 A | 1/2015 |
| WO | 9736729 | 10/1997 |
| WO | 2010037810 | 4/2010 |
| WO | 2013087587 A1 | 6/2013 |

OTHER PUBLICATIONS

International Search Report and Written Opinion of the International Searching Authority for International Application No. PCT/EP2014/075790 dated Feb. 20, 2015.

Notification of Reasons for Refusal for Japanese Application No. 2016-535012, dated Jul. 14, 2017, including English translation, 11 pages.

Chinese Office Action for Chinese Application No. 201480065123.1, dated Apr. 12, 2017, including English translation, 13 pages.

* cited by examiner

SENSOR PRODUCTION BY HOLDING THE INTERMEDIATE INJECTION-MOLDED PART

CROSS REFERENCE TO RELATED APPLICATIONS

This application is the U.S. National Phase Application of PCT International Application No. PCT/EP2014/075790, filed Nov. 27, 2014, which claims priority to German Patent Application No. 10 2013 224 464.9, filed Nov. 28, 2013, and German Patent Application No. 10 2014 208 429.6, filed May 6, 2014, the contents of such applications being incorporated by reference.

FIELD OF THE INVENTION

The invention relates to a method for producing an electronic assembly and an electronic assembly.

BACKGROUND OF THE INVENTION

Known from WO 2010/037 810 A1, which is incorporated by reference is an electronic device in the form of a sensor for outputting an electrical signal that is dependent on a physical quantity, which is detected by means of a physical field based on a sensor.

SUMMARY OF THE INVENTION

An aspect of the present invention is an improvement of the known electronic assembly.

According to one aspect of the invention, the method for producing an electronic device comprises the steps of encasing an electronic assembly with a first casing material, holding the electronic assembly encased by the first casing material by means of a holding element in such a manner that the holding element is spaced apart from the electronic assembly above the casing material, and encasing the assembly held on the holding element with a second casing material.

The specified method is based on the consideration that the electronic assembly must be completely encased at least by one of the two casing materials, so that both elements are protected from moisture and other influences having a weathering effect. For the encasing of the electronic assembly, this could be inserted into a so-called carrier, which is then, for example, injection-molded with a single casing material. However, such a carrier must be manufactured additionally and in principle has a holding element, which must usually be broken off after manufacture of the electronic assembly. In so doing, there is a danger, which should not be underestimated, that the sealing effect intended by the casing material is destroyed. In addition, the carrier must be specially created, which is accordingly costly.

A different path is therefore followed within the framework of the specified method. Here, in a first step the electronic assembly is encased by the first casing material. In this case, no consideration needs to be given to whether the first casing material actually tightly encases the electronic assembly or not. Said electronic assembly rather serves as a support for a holding element, on which the intermediate product of the electronic device to be fabricated is held during encasing by the second casing material. In this state, the electronic device can be resistantly sealed against weathering influences such as moisture by the second casing material.

In a further development of the specified method, a tight fit element, called labyrinth element, is formed on the first casing material, which after the encasing by the second casing material forms a labyrinth gap between the first casing material and the second casing material. Usually, the electronic device cannot be completely encased by the second casing material because, for example, places must be kept open, at which an electrical connection for the electronic assembly must be held in readiness.

The ultimately formed labyrinth gap can be designed arbitrarily and is intended to fulfill the function of a labyrinth seal known per se, also called gap seal. This involves a contact-free shaft seal. The sealing effect is based on fluidic effects through the extension of the gap to be sealed. The flow resistance is thereby increased. The path extension is usually achieved by an intermeshing (technical expression "interlacing") of mold elements on the shaft and the fixed housing part.

In an additional further development of the specified method, the labyrinth element is configured to run around a holding region, in which the holding element for holding the electronic assembly encased by the first casing material is set. When encasing the first casing material by the second casing material, in principle the first casing material cannot be encased at that location at which the aforesaid intermediate product is held with the holding element on the first casing material. In order to offer here a high protection from ingressing moisture, it is proposed to form the aforementioned labyrinth gap primarily in this region.

In a particular further development of the specified method, the first casing material and the second casing material are configured in such a manner that during the encasing of the first casing material, the second casing material fuses this in certain regions. In this way, the first casing material and the second casing material can be joined together in a seamlessly bonded manner and at least partially close the aforesaid gap between the two casing materials.

For this purpose, in a particularly preferred embodiment of the specified method, a melting rib can be formed on the first casing material, which is fused in certain regions during encasing by the second casing material. This melting rib can, for example, be the aforesaid labyrinth element.

In another further development, the specified method comprises the step of forming a tight fit element called receiving element on the first casing material, which is adapted to receive the holding element at least positively. In addition, the holding element could however even be held non-positively or even in a seamlessly bonded manner in the receiving element. During holding of the aforesaid intermediate product by the holding element, the receiving element increases the stability of the holding element and thus enables a precise and resistant positioning.

In an additional further development of the specified method, after encasing the electronic assembly by the first casing material, the holding element is introduced into the receiving element. In this way, it is ensured that the holding element rests on the first casing material and not on the electronic assembly, which in this way is effectively sealed against moisture.

In yet another further development of the specified method, the electronic assembly has an electrical connection for electrical contacting, on which the electronic assembly is held during encasing by the first casing material and by the second casing material. The electronic device can be further stabilized during its encasing by means of this electronic connection.

In a preferred further development, the specified method comprises the steps of arranging a fastening element next to the electronic assembly encased by the first casing material, and encasing the electronic assembly encased by the first casing material and the fastening element by the second casing material. By means of this fastening element, the electronic assembly can be fastened to a superordinate device such as, for example, a vehicle. It is particularly favorable for this further development that with a suitable choice of material, the two casing materials can decouple the electronic assembly mechanically with respect to the superordinate device. For this purpose, the two materials should be selected to be as elastic as possible.

According to a further aspect of the invention, an electronic device is produced by one of the specified methods. The electronic device is preferably a sensor. This sensor particularly preferably comprises a sensing element, which is adapted to detect an encoder field dependent on a quantity to be measured, and to output a measurement signal dependent on the encoder field. The measurement signal can then be output directly or processed by means of a signal processing circuit via a cable to a superordinate control device. The encoder field can in this case be a force field or a magnetic field.

Particularly preferably, the sensor is an inertial sensor or a speed sensor, which can installed in a vehicle.

According to a further aspect of the invention, a vehicle includes at least one of the aforesaid sensors.

BRIEF DESCRIPTION OF DRAWINGS

The properties, features, and advantages of this invention described above as well as the manner in which these are achieved, will become clearer and significantly more understandable in connection with the following description of the exemplary embodiments, which are explained in detail with reference to the drawings, wherein.

DETAILED DESCRIPTION OF THE PREFERRED EMBODIMENTS

In the figures the same technical elements are provided with the same reference numbers and only described once.

Figure 1:
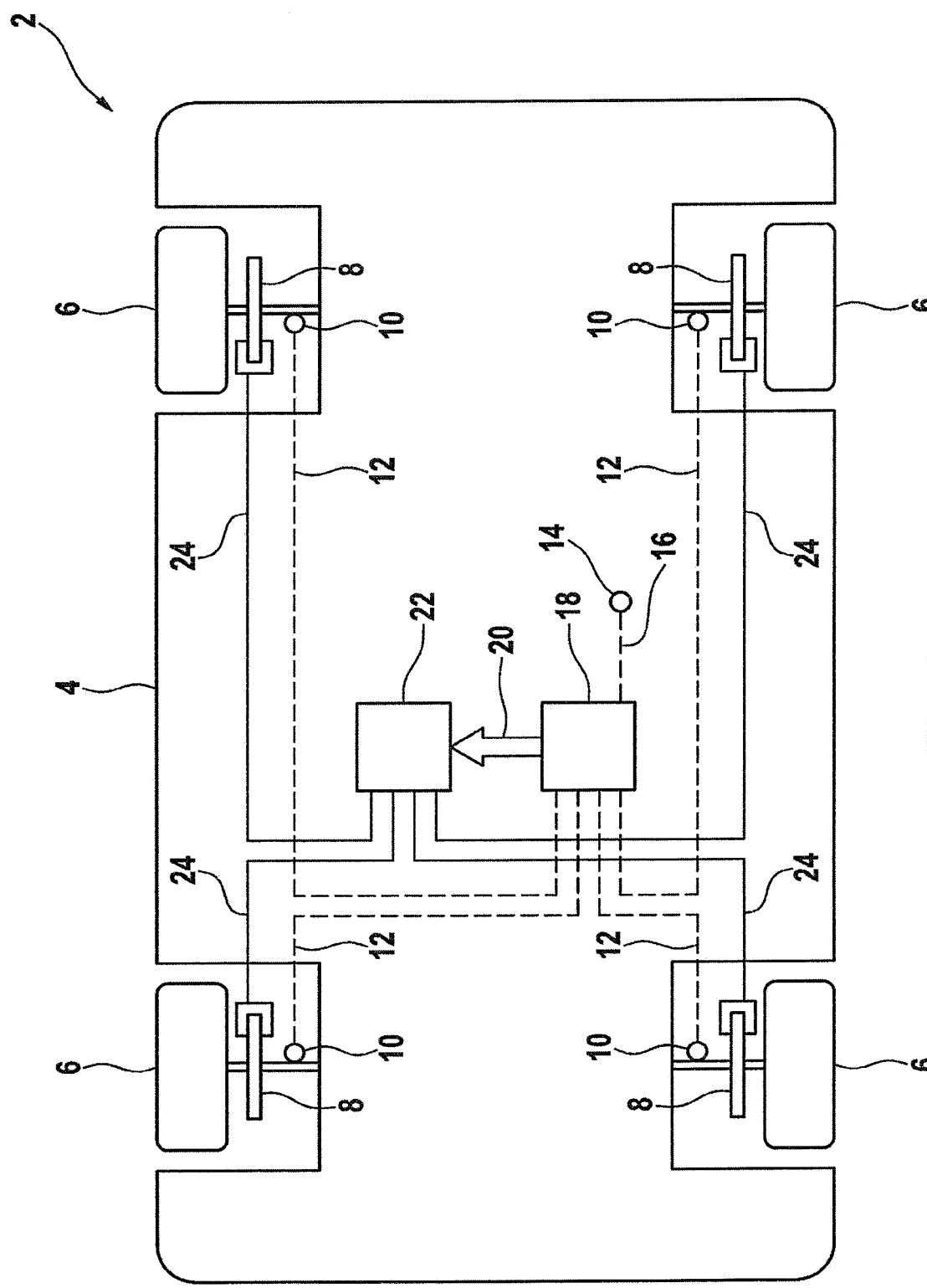
FIG. 1 shows a schematic view of a vehicle with a driving dynamic control.

Reference is made to FIG. 1, which shows a schematic view of a vehicle 2 with a driving dynamic control known per se. Details of this driving dynamic control can be found, for example, in DE 10 2011 080 789 A1, which is incorporated by reference.

The vehicle 2 comprises a chassis 4 and four wheels 6. Each wheel 6 can be slowed with respect to the chassis 4 by means of a brake 8 fastened in a fixed position on the chassis 4, in order to slow a movement of the vehicle 2 on a road not shown further.

In this case, it can occur in a manner known to the person skilled in the art that the wheels 6 of the vehicle 2 lose their road holding and the vehicle 2 even moves away from a trajectory predefined, for example, by means of a steering wheel not shown further, as a result of understeer or oversteer. This is avoided by control circuits known per se such as ABS (antilock braking system) and ESP (electronic stability program).

In the present embodiment, the vehicle 2 has speed sensors 10 on the wheels 6 for this purpose, which detect a speed 12 of the wheels 6. Furthermore, the vehicle 2 has an inertial sensor 14, which detects driving dynamic data 16 of the vehicle 2, from which, for example, a pitch rate, a roll rate, a yaw rate 15 indicated in FIG. 3, a transverse acceleration 17 indicated in FIG. 3, a longitudinal acceleration 19 indicated in FIG. 3, and/or a vertical acceleration can be output in a manner known per se to the person skilled in the art. For example, the detection of the yaw rate 15 and the transverse acceleration 17 are required to implement the driving dynamic control.

On the basis of the detected speeds 12 and driving dynamic data 16, a controller 18 can determine in a manner known to the person skilled in the art whether the vehicle 2 is skidding on the roadway or is even departing from the aforesaid predefined trajectory, and react accordingly to this with a controller output signal 20 known per se. The controller output signal 20 can then be used by an adjusting device 22 in order to actuate by means of corrective signals 24 actuators such as the brakes 8, which respond in a manner known per se to the skidding and the departure from the predefined trajectory.

Figure 2:
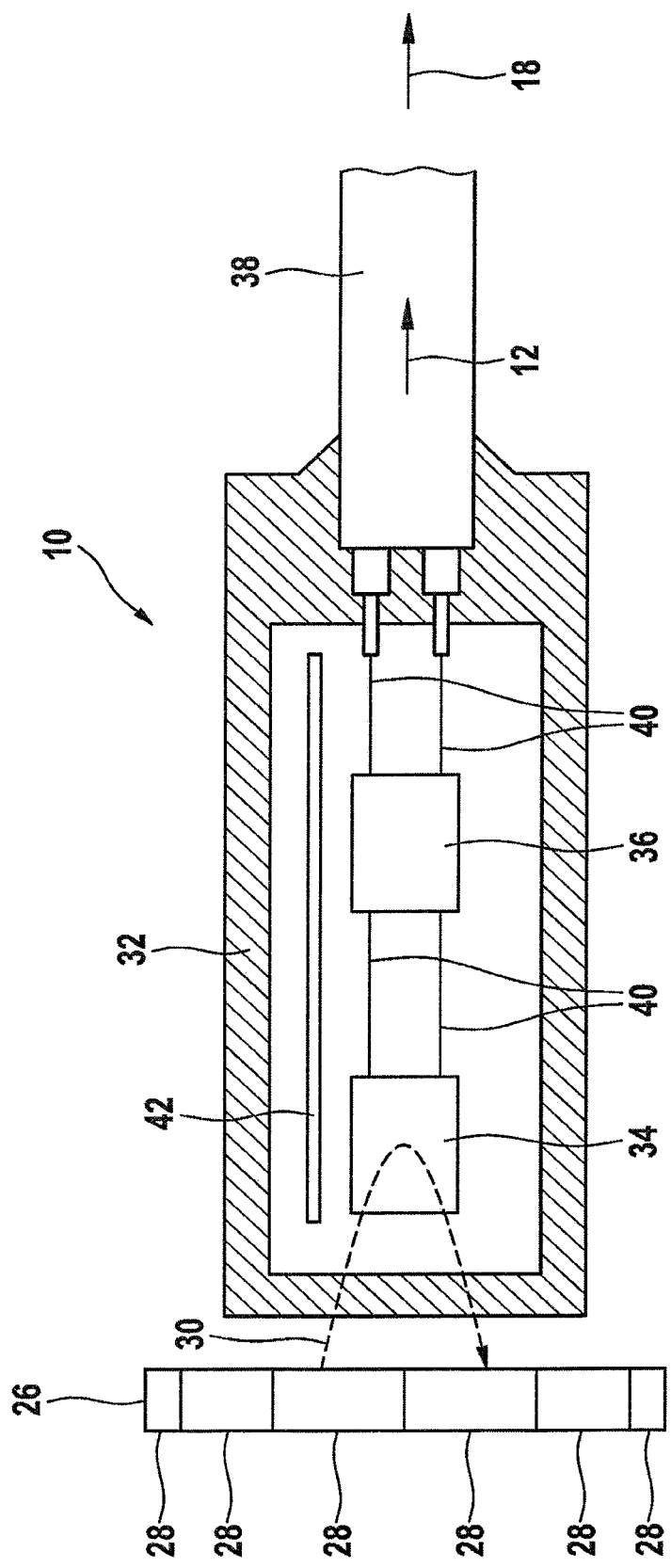
FIG. 2 shows a schematic view of a speed sensor in the vehicle of FIG. 1.

Reference is made to FIG. 2, which shows a schematic view of the speed sensor 10 in the vehicle 2 of FIG. 1.

In the present embodiment, the speed sensor 10 is executed as an active speed sensor 10, within the framework of which a magnetic field 30 is delivered by an encoder disc 26 connected in a torqueproof manner to one of the wheels 6, which encoder disc is composed of a plurality of magnetic poles 28. The magnetic field 30 passes through a sensing element 34 enclosed in a housing 32, which is connected via a signal processing circuit 36 to a data cable 38, via which the speed 12 can be transmitted to the controller 18. In this case, the sensing element 34, the signal processing circuit 36, and the data cable 38 can be wired to one another by means of wirings 40, for example, in the form of a leadframe. A shield plate 42 can be provided in order to increase the electromagnetic compatibility of the speed sensor 10.

Further background information on active speed sensors can be obtained, for example, from DE 101 46 949 A1, which is incorporated by reference.

Figure 3:
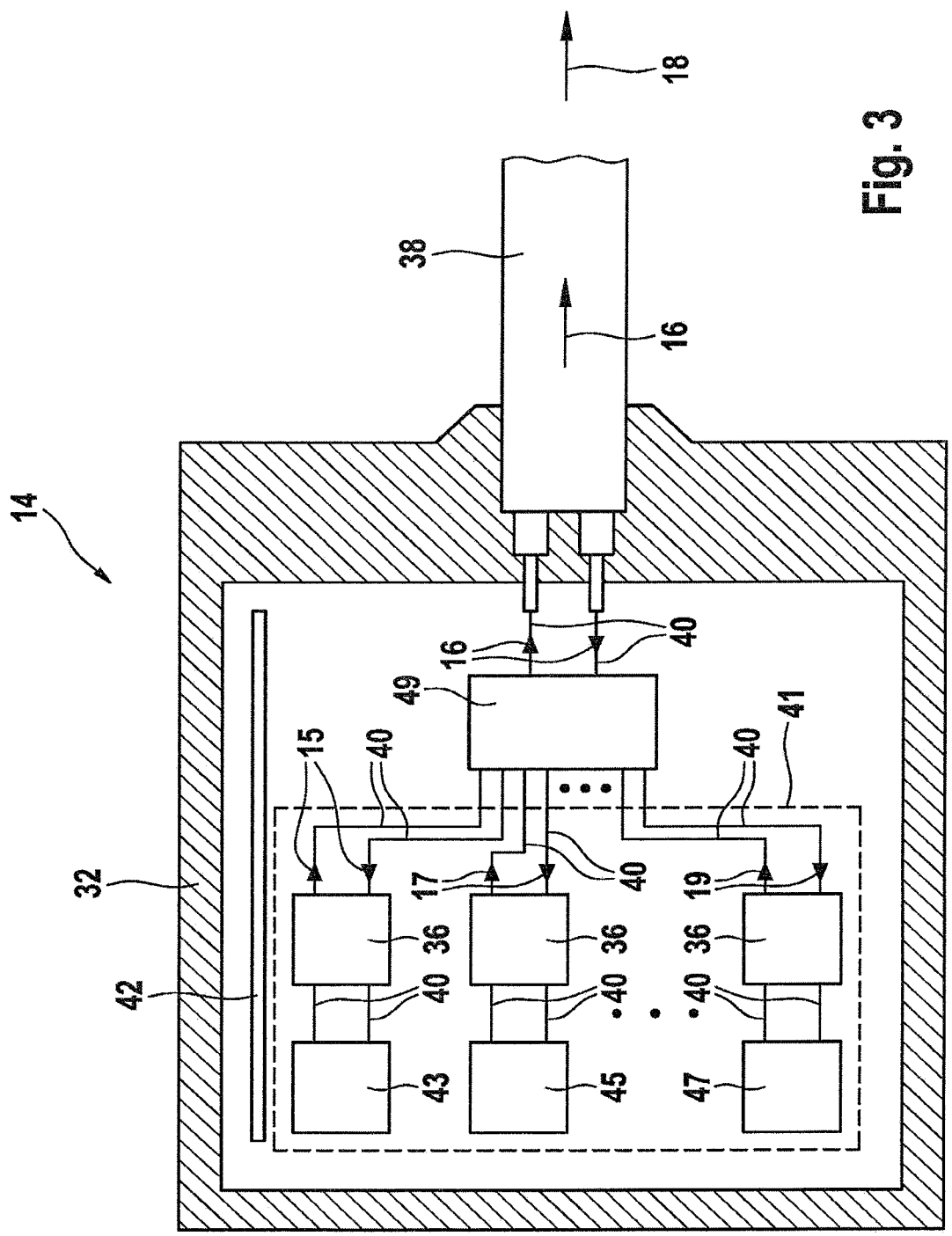
FIG. 3 shows a schematic view of an inertial sensor in the vehicle of FIG. 1.

Reference is made to FIG. 3, which shows a schematic view of the inertial sensor 14 from FIG. 1.

For the driving dynamic control explained in FIG. 1, as described, for example, in DE 10 2006 053 308 A1, which is incorporated by reference, at least the yaw rate 15 must be detected. The detection of the transverse acceleration 17 is also appropriate within the framework of the driving dynamic control. However, rates of rotation and accelerations in any spatial directions can be detected with the inertial sensor 14 depending on the application. In this case, for the sake of clarity, it will be assumed hereinafter that for each rate of rotation and for each acceleration, its own sensing element is required, where the individual sensing elements in the inertial sensor 14 of FIG. 3 are combined to form a sensor cluster 41.

The inertial sensor 14 in FIG. 3 should be configured, for example, as a six-axis inertial sensor, which is capable of detecting the rates of rotation and accelerations in all three spatial directions. For this purpose, the sensor cluster 41 subject to the aforesaid requirement must comprise six different sensing elements. For the sake of clarity, however, only three of the sensing elements in the sensor cluster 41 are shown in FIG. 3 and specifically in detail, a yaw rate sensing element 43, a transverse acceleration sensing element 45, and a longitudinal acceleration sensing element 47.

Each of the sensing elements 43, 45, 47 is connected via wirings 40 to its own signal processing circuit 36, via which the respective sensing elements 43, 45, 47 output to the respective signal processing circuit 36 a measurement signal not further indicated, which is dependent on the respective measured quantity 15, 17, 19 to be detected.

The individual signal processing circuits 36 in the inertial sensor 14 determine the respective measured quantity 15, 17, 19 from the measurement signal received in each case from the individual sensing elements 43, 45, 47 and output this as digital data via wirings to a data interface 49.

The data interface 49 then modulates the received digital data according to a determined pattern and transmits this as the driving dynamic data 16 to the controller 18. The modulation pattern in this case depends on the interface used. In the automobile area, various interfaces are commonly used such as, for example, an interface to a controller area network bus, called CAN bus. Sensor data such as the measured quantities 15, 17, 19 from the inertial sensor 14 can, however, be transmitted in a particularly efficient manner with a so-called peripheral sensor interface 5, called PSI5 interface, via a two-wire line as data cable 38 to the controller, which is why the data interface 49 can be configured in a particularly favorable manner as PSI5 interface 49. Further information on this can be deduced from the relevant standard.

The present invention will be illustrated in further detail by reference to the inertial sensor 14 shown in FIGS. 1 and 3, even though the present invention can be implemented on any electronic devices and in particular on any sensors such as the speed sensors 10, magnetic field sensors, structure-borne sound sensors, or temperature sensors.

When used in the aforesaid vehicle 2, it is particularly important for a high longevity of the inertial sensor 14 that this is sealed as tightly as possible against ingressing moisture. Precisely because the inertial sensor 14 is installed on the wheel 6, which can throw up a not inconsiderable quantity of dirt and moisture during travel of the vehicle 2, sealing against ingressing moisture acquires a very high importance, which avoids that, for example, the wiring 40 corrodes and is interrupted.

In order to achieve this, the electronic assembly 44 of the inertial sensor 14 comprising the sensor cluster 41 and the PSI5 interface 49 is encased in the following manner.

Figure 4:
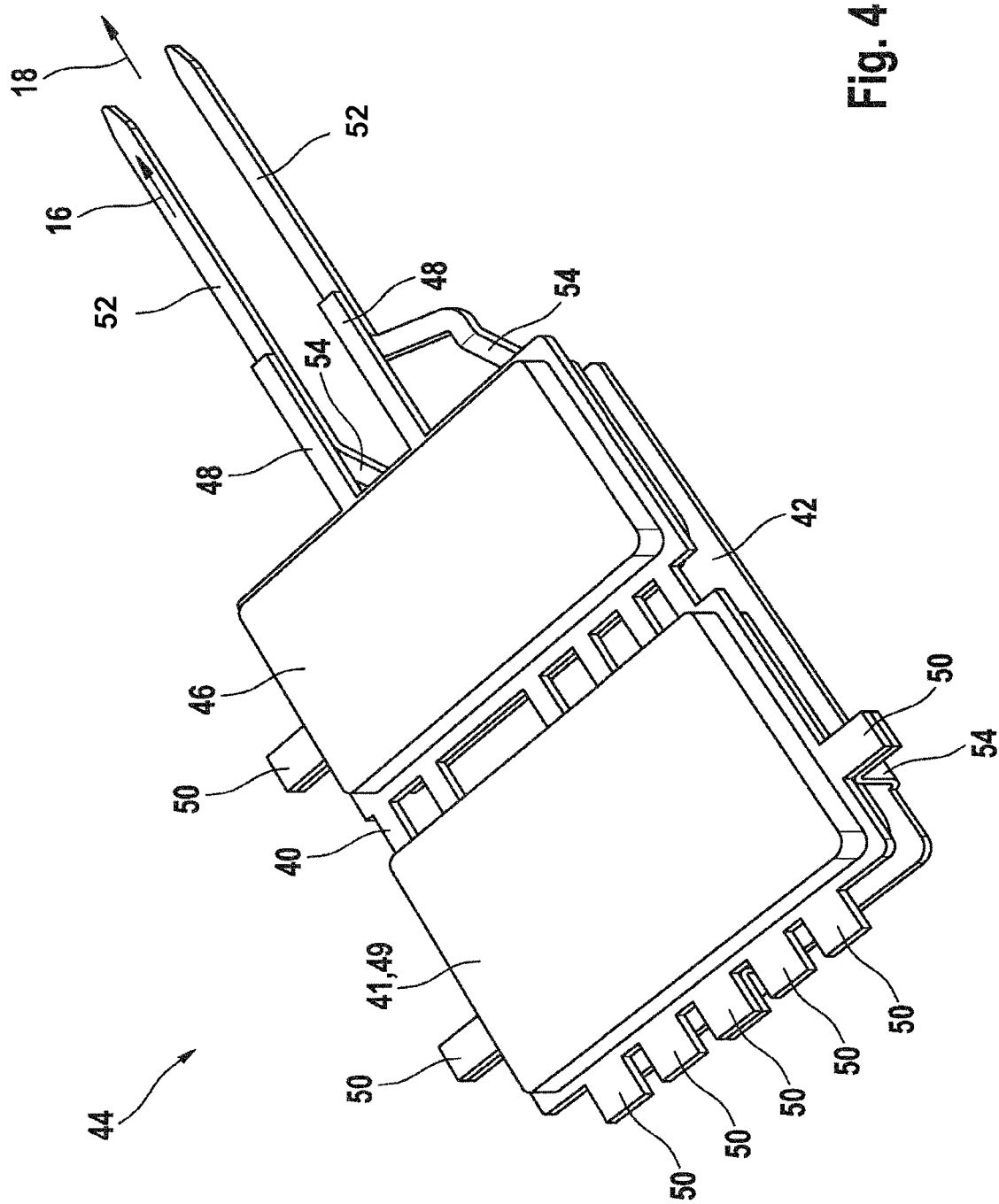
FIG. 4 shows a schematic view of an electronic assembly in the inertial sensor of FIG. 1.

The electronic assembly 44 is shown in FIG. 4. In this assembly the sensor cluster 41 and the PSI5 interface 49 can be arranged on a common integrated circuit. The electronic assembly 44 can further comprise another protective capacitor 46, which protects the sensor cluster 41 and the PSI5 interface 49, for example, from any overvoltage.

In the present exemplary embodiment, a leadframe is selected in a nonrestrictive manner as wiring 40, from which two contact pins 48 and a number of protruding regions in the form of retaining pins 50 project.

Whereas the retaining pins 50 will be described in detail at a later point, the contact pins 48 are connected electrically to connector pins 52, to which in turn the data cable 38 can be connected, in order, as indicated in FIG. 2, to transmit the speed 12 to the controller 18.

Supporting elements 54 project from the shield plate 42, when viewed in the plane of the shield plate 42. These are formed in one piece with the connector pins 42 and are connected electrically and mechanically to the contact pins 48 and to a side opposite the contact pins 48 by means of the wiring 40 executed as a leadframe.

Figure 5:
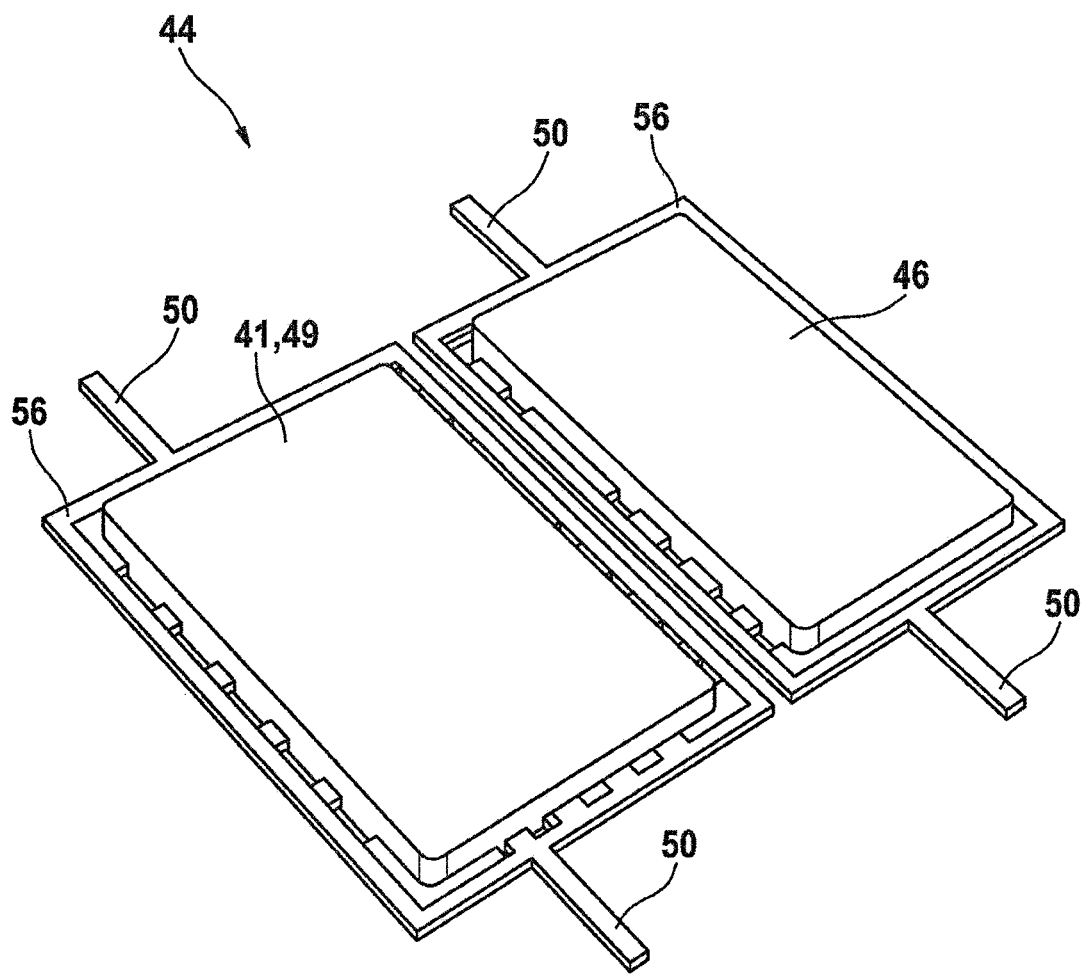
FIG. 5 shows a schematic view of an alternative electronic assembly in the inertial sensor of FIG. 1.

The retaining pins 50 can, in principle, be designed arbitrarily. As shown, for example, in FIG. 5, the retaining pins 50 can also adjoin common frames 56, which accordingly can enclose the integrated circuit with the sensor cluster 41 and the PSI5 interface 49, as well as the protective capacitor 46. The surface of the retaining pin 50 can in this case be configured arbitrarily. In order to optimally execute the function explained hereinafter, the retaining pins 50 and/or the frame 56 should be structured with grooves, embossings, or the like. Furthermore, these can also be provided with constrictions or holes. In principle however, the shape of the retaining pins 50 and/or the frame 56 is arbitrary.

For encasing the electronic assembly 44, this is held on the retaining pins 50 and on the connector pins 52 with a tool not shown in detail. This is then followed by a first encasing with a first casing material 58, shown in FIG. 6, for example, by an original molding method such as injection molding. To this end, the electronic assembly 44 can be inserted into a casting mold not shown further. The first casing material 58 is injected into this casting mold, so that it can assume the shape shown in FIG. 6.

Figure 6:
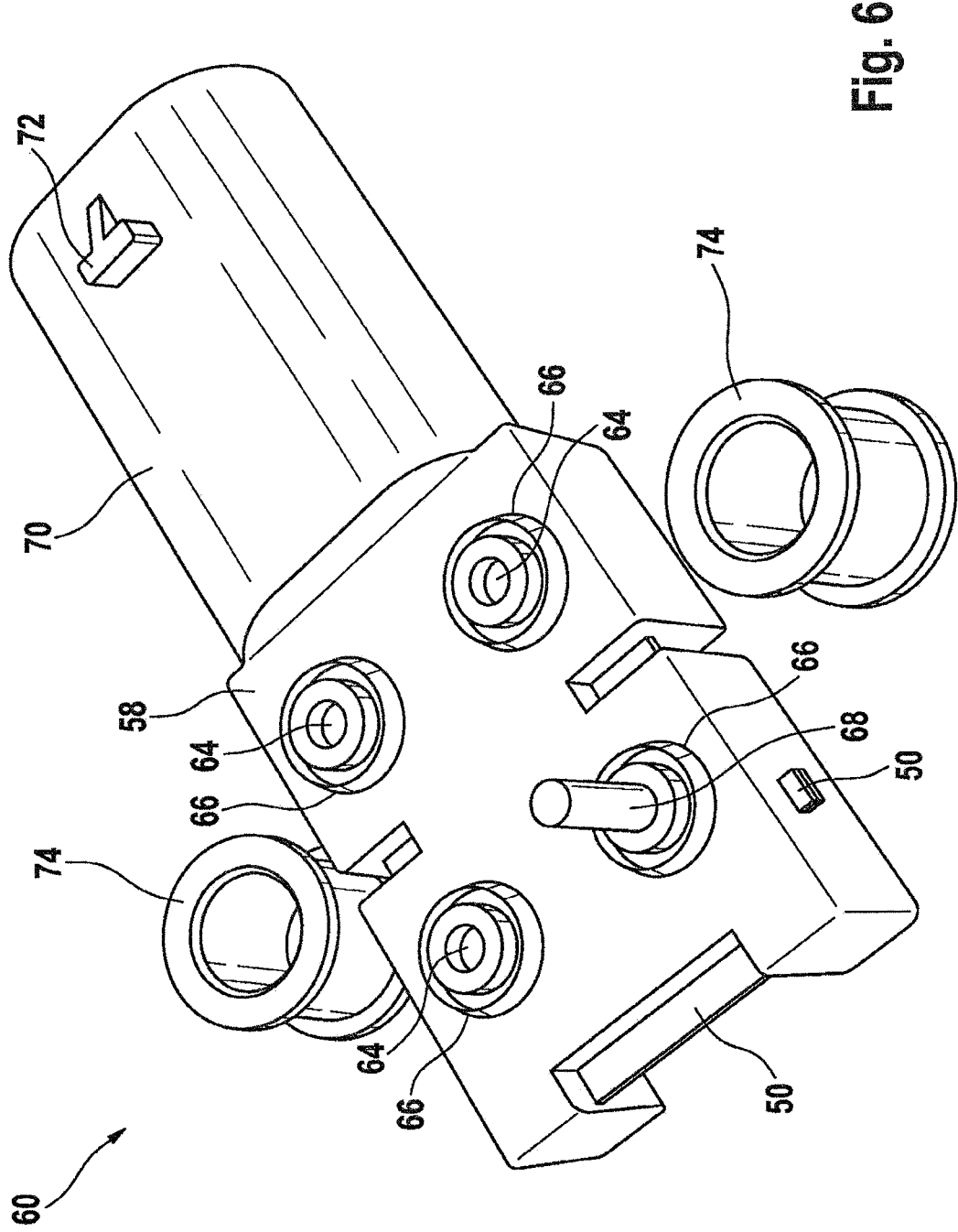
FIG. 6 shows a schematic view of an intermediate product of the inertial sensor of FIG. 1.
Figure 7:
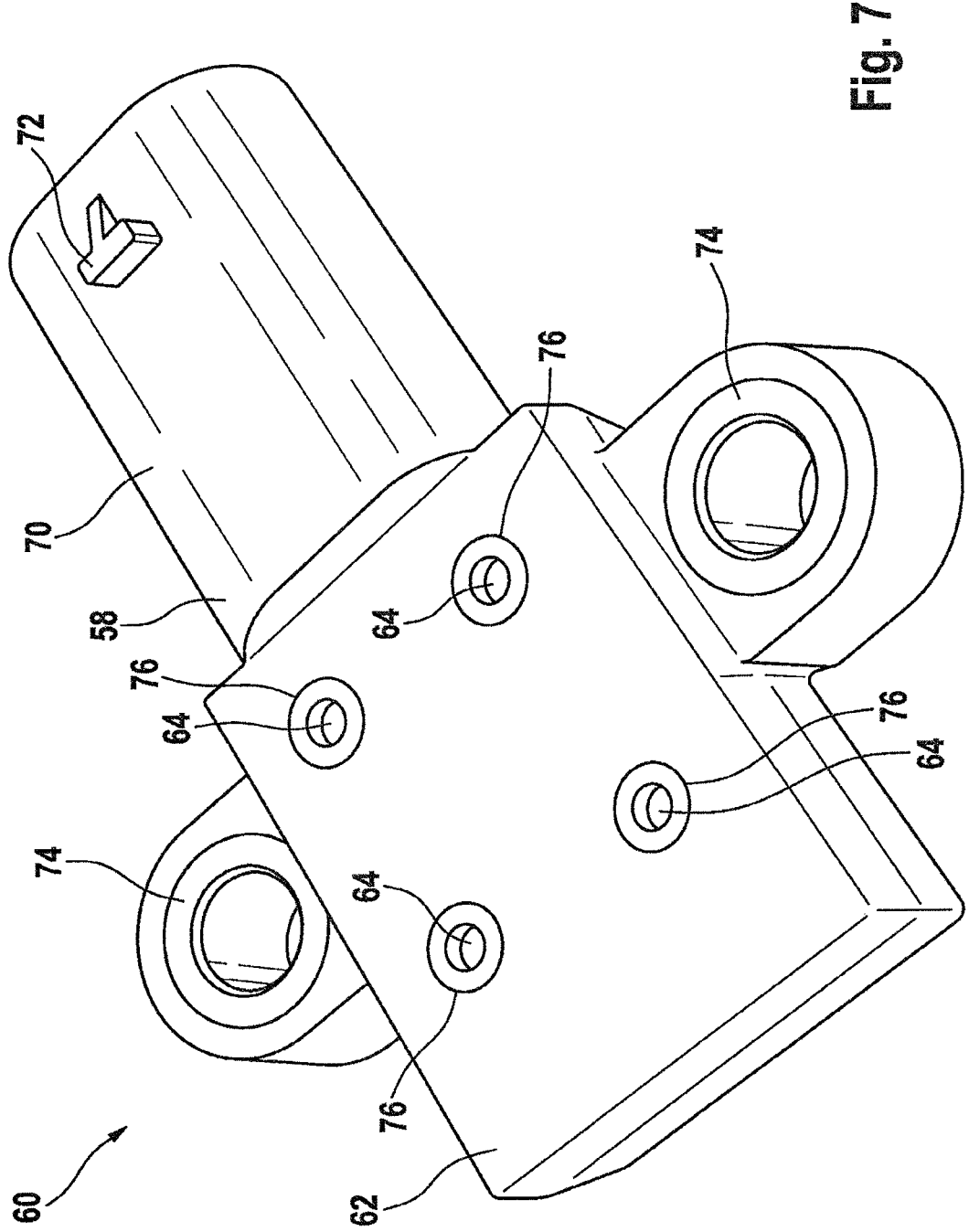
FIG. 7 shows a schematic view of the inertial sensor of FIG. 1.

Due to the fact that the electronic assembly 44 must rest on at least one location in the casting mold, the intermediate product 60, also called pre-injection molded part, which can be seen in FIG. 6, has locations exposed at the retaining pins 50 via which, in principle, moisture could penetrate to the electronic assembly 44. In order to avoid this, within the framework of the present embodiment, the intermediate product 60 is encased by a second casing material 62, which can be seen subsequently in FIG. 7.

In order to perform this second encasing particularly effectively, within the framework of the present embodiment, four receiving elements 64 are formed in the first casing material 58, which are each surrounded by a labyrinth element 66. Respectively one holding element 68 can be inserted into these receiving elements 64, of which only one is shown for clarity in FIG. 7. The receiving elements 64 therefore serve as holding regions for the holding elements 68. These holding elements 68 will be discussed in detail at a later point.

In order to protect the data cable 38 connected to the connector pins 52 from ingressing moisture, the connector pins 52, which cannot be seen in FIG. 6, are surrounded by a connector housing 70, into which a connector not shown further in the figures, connected to a data cable 38, can be inserted positively. A latching element 72 is further formed on the connector housing 70, on which the connector with the connector housing 70 can be engaged with a corresponding latching element.

Before the encasing with the second casing material 62, within the framework of the present embodiment, fastening elements 74 in the form of sockets are arranged next to the first casing material 58. In this case, the intermediate product 60 can again be received in a corresponding casting mold, which cannot be seen in FIG. 6, and held therein on the holding elements 68. The holding elements 68 can also be part of this casting mold.

The holding elements 68 rest on the first casing material 58 and have no direct contact with the electronic assembly 44. If the intermediate product 60 held in the further casting mold is therefore encased with the second casing material 62, the first casing material 58 and the second casing material 62 then form a labyrinth gap 76 indicated in FIG. 7, which extends, starting from the receiving elements 64, via the labyrinth elements 66 and the surface of the first casing material 58 as far as the retaining pins 50. Only there can any ingressing moisture come in contact with the electronic assembly 44 and corrode this.

The labyrinth elements 66 further lengthen the labyrinth gap 76, where naturally a plurality of labyrinth elements 66 arranged concentrically to one another, can further extend the labyrinth gap 76.

In order to partially close the labyrinth gap 76, for example, the labyrinth elements 66 can be configured as melting ribs. That is to say that at this point, during encasing with the second casing material 62, the first casing material 58 melts and becomes joined to the second casing material 62. In this way, the labyrinth gap 76 is closed in a seamlessly bonded manner. Alternatively, the labyrinth elements 66 could naturally also be formed as grooves.

After the encasing with the second casing material 62, the holding elements 68 could be removed from the receiving elements 64 again, if this is desired.

A material which is resistant to weathering, for example in the form of a plastic, should be selected as first casing material 58 and as second casing material 62. In this case, for example, for each of the two casing materials, an arbitrary combination can be selected from the materials thermoplastic, thermosetting plastic, and elastomers.

The invention claimed is:

1. A method for producing an electronic device, comprising:
    encasing an electronic assembly with a first casing material,
    forming a tight fit receiving element on the first casing material, the receiving element adapted to receive a holding element in a positive manner;
    holding the electronic assembly encased by the first casing material by the holding element in such a manner that the holding element is spaced apart from the electronic assembly above the first casing material, and
    encasing the assembly held on the holding element with a second casing material, the encasing including encasing the holding element within the receiving element such that the holding element becomes integral with the electronic assembly.

2. The method as claimed in claim 1, comprising:
    forming a tight fit element called labyrinth element on the first casing material, which after the encasing by the second casing material forms a labyrinth gap between the first casing material and the second casing material.

3. The method as claimed in claim 2, wherein the labyrinth element is configured to run around a holding region, in which the holding element for holding the electronic assembly encased by the first casing material is set.

4. The method as claimed in claim 1, wherein the first casing material and the second casing material are configured in such a manner that during the encasing of the first casing material, the second casing material fuses this in certain regions.

5. The method as claimed in claim 4, comprising forming a melting rib on the first casing material, which is fused in certain regions during encasing by the second casing material.

6. The method as claimed in claim 4, wherein after encasing the electronic assembly by the first casing material, the holding element is introduced into the receiving element.

7. The method as claimed in claim 1, wherein the electronic assembly has an electrical connection for electrical contacting, on which the electronic assembly is held during encasing by the first casing material and/or by the second casing material.

8. The method as claimed in claim 1, comprising:
    arranging a fastening element next to the electronic assembly encased by the first casing material, and
    encasing the electronic assembly encased by the first casing material and the fastening element by the second casing material.

9. A method for producing an electronic device, comprising:
    encasing an electronic assembly with a first casing material,
    forming a receiving element on the first casing material, which is adapted to at least positively receive the holding element, wherein the holding element holds the first casing material in such a manner that the holding element is spaced apart from the electronic assembly above the first casing material, and
    encasing the assembly held on the holding element with a second casing material, the encasing including encasing the holding element within the receiving element such that the holding element becomes integral with the electronic assembly.

* * * * *